United States Patent [19]

Betterton et al.

[11] Patent Number: 4,805,460

[45] Date of Patent: Feb. 21, 1989

[54] OIL PRESSURE TRANSDUCER

[75] Inventors: Joseph T. Betterton, Arab; Alfred H. Glover, Decatur; Ranald L. Griffin, Huntsville, all of Ala.; Anthony J. Kerstiens, El Paso, Tex.

[73] Assignee: Chrysler Motors Corporation, Highland Park, Mich.

[21] Appl. No.: 116,438

[22] Filed: Nov. 3, 1987

[51] Int. Cl.[4] .......................... G01L 7/08; G01L 9/02

[52] U.S. Cl. ...................................... 73/725; 73/746; 338/39; 338/42

[58] Field of Search ......................... 73/725, 719, 746; 338/42, 39

[56] References Cited

U.S. PATENT DOCUMENTS 4,449,112 5/1984 Gould .................................. 73/725

*Primary Examiner*—Donald O. Woodiel

*Attorney, Agent, or Firm*—Kenneth H. MacLean, Jr.

[57] ABSTRACT

A pressure transducer to measure and indicate fluid pressure levels including a housing in which a diaphragm and piston assembly is movable in response to pressure changes, the piston having a portion extending therefrom to engage a switch contact thereby disengaging the switch when the fluid pressure falls below a desired level.

2 Claims, 4 Drawing Sheets

OIL PRESSURE TRANSDUCER

BACKGROUND OF THE INVENTION

An oil pressure transducer is used with internal combustion engines in automobiles to measure the oil pressure and to produce a corresponding indicator signal. There have been a variety of designs for such pressure transducers many of which utilize a diaphragm, one side of which is exposed to a pressurized fluid such as the oil of the lubricating system. An design object is to provide a simple, compact yet reliable device. In addition to measuring and indicating oil pressure, modern automobiles also typically utilize a fuel injection type system for the engine which includes an electric motor to power a fuel or gasoline pump. In some instances, it is desirable to incorporate an electical switch mechanism in the pressure transducer for controlling the fuel pump in response to oil pressure. Specifically, it is desirable to maintain the fuel pump motor in an inactive condition until a minimum oil pressure is reached.

A number of United States patents generally disclose a pressure transducer and switch mechanism, either singularly or in combination. For example, U.S. Pat. No. 3,321,594 to Reise discloses a fluid pressure actuated switch with a diaphragm sensor operatively associated with electrical contacts for controlling an electric fuel pump motor. The U.S. Pat. No. 4,255,630 to Hire also discloses an electrical switch which is responsive to fluid pressure to control a fuel pump motor. The U.S. Pat. No. 4,524,255 to Haag discloses a switch with a movable diaphragm responsive to fluid pressure to open and close contacts of an electrical circuit.

The U.S. Pat. No. 4,581,941 to Obermann discloses a fluid pressure transducer including a switch therein adapted to control a fuel pump motor and utilizes a diaphragm and contacts.

Several other patents have been uncovered which disclose pressure transducers without the switching device. These include U.S. Pat. Nos. 3,504,324; 4,449,112; and 4,452,202. All of the patents discussed or identified heretofore broadly disclose a pressure transducer with or without a switching mechanism but do not specifically disclose the desirable features in the fluid pressure transducer with a switching device as described hereinafter.

SUMMARY OF THE INVENTION

It has been recognized from the patent disclosures identified above that a pressure transducer utilizing a diaphragm which is movable in response to fluid pressure changes is known. Likewise, the utilization of a diaphragm generally to move contacts is also well known. Likewise, the use of the aforesaid diaphragm movements to measure and indicate fluid pressure for producing an electrical indicator signal is known.

The subject pressure transducer and switch assembly incorporates desirable design features to better monitor an indicate fluid pressure. Specifically, the housing of the transducer encloses a piston like member movable along with a diaphragm's mid portion in response to pressure changes. The piston also carries an electrical contact bearing assembly which engages a resistor board supported by a separate terminal support member. The terminal support member is adjustably and insertably attached to the transducer housing and is removable therefrom as a unit for servicing or the like. The terminal support member is inserted into the transducer housing to an extent which determines the pressure indicating calibration and thus the electrical indicating output.

The subject transducer and switch assembly also includes a desirable switch design for a fuel pump motor including a switch contact bar which is yieldably held in a normally closed contact with conductors in the transducer housing. A portion of the above identified piston engaegs the contact bar to move it to a disengaged or open position with respect to the conductors when the oil pressure falls below a predetermined minimum level. As a result, the engine does not receive fuel or start until a minimum oil pressure level is generated.

Therefore, an object of the invention described and claimed in this application is to provide a simple, compact, inexpensive yet reliable fluid pressure responsive transducer having operative parts and assemblies which are conveniently assembled together and therefore easily serviced and that are associated together in a manner which readily permits calibration of the transducer.

A further object of the subject invention is to provide an improved combination pressure transducer and switch assembly compactly within the transducer housing and with the switch portion directly operated by the movable transducer components in response to fluid pressure effects.

A still further object of the invention is to provide an improved combination transducer and switch assembly with conductors in the transducer housing serving as switch contacts and with electrical connector means in a separate terminal bearing member adjustably contacting the conductors to provide electrical continuity through the switch.

Further advantageous features and objects of the subject device will be more readily apparent from a reading of the following detailed description of an embodiment and with reference to the drawings of a preferred embodiment the transducer.

IN THE DRAWINGS

FIG. 1 is an elevational view of the combination pressure transducer and switching assembly; and FIG. 2 is an enlarged planer view of the transducer and switching assembly looking in the direction of arrow 2 shown in FIG. 1; and FIG. 3 is a sectioned view of the assembly taken along section line 3—3 in FIG. 2 and looking in the direction of the arrows; and FIG. 4 is a sectioned view of the assembly taken along section line 4—4 in FIG. 2 and looking in the direction of the arrows; and FIG. 5 is a sectioned view of the assembly taken along section line 5—5 in FIG. 4 and looking in the direction of the arrows; and FIG. 6 is a sectioned view of the assembly taken along section lines 6—6 in FIG. 3 and looking in the direction of the arrows; and FIG. 7 is a fragmentary sectioned view of the assembly taken along section line 7—7 in FIG. 6 and looking in the direction of the arrows; and FIG. 8 and FIG. 9 are fragmentary sectional views taken along section line 8—8 in FIG. 6 and alternately showing the switch assembly in closed and open operative positions respectively.

DESCRIPTION OF A PREFERRED EMBODIMENT

Figure 1:
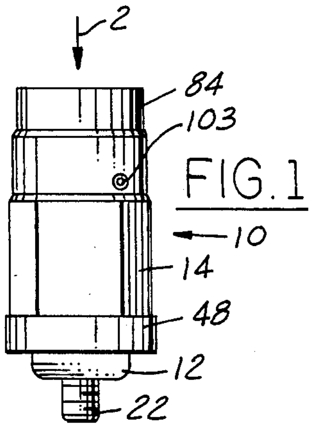

In FIG. 1, the subject transducer and switch assembly 10 is illustrated. Assembly 10 includes two housing portions 12 and 14 also shown and in better detail in FIGS. 3 and 4. Specifically, housing portion 12 has a generally cup shaped configuration defining a generally hollow interior 16. It has an end portion 18 with a centrally positioned aperture or opening 20 therethrough. The housing 12 has a threaded cylindrical portion 22 which is adapted to attache assembly 10 to an automobile engine. Specifically the portion 22 connects opening 20 to a pressurized oil lubrication passage of the engine. Resultantly, pressurized oil is admitted through opening 20 to the interior space 16. The upper end of the housing 12 includes a radially or outwardly extending flange portion 24 for engagement with the other housing 14.

Figure 2:
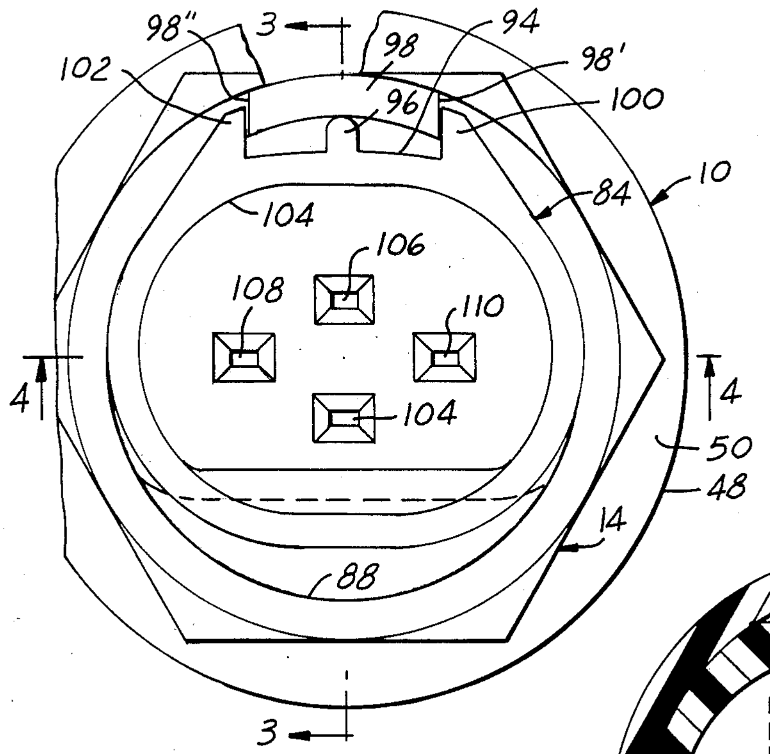
Figure 6:
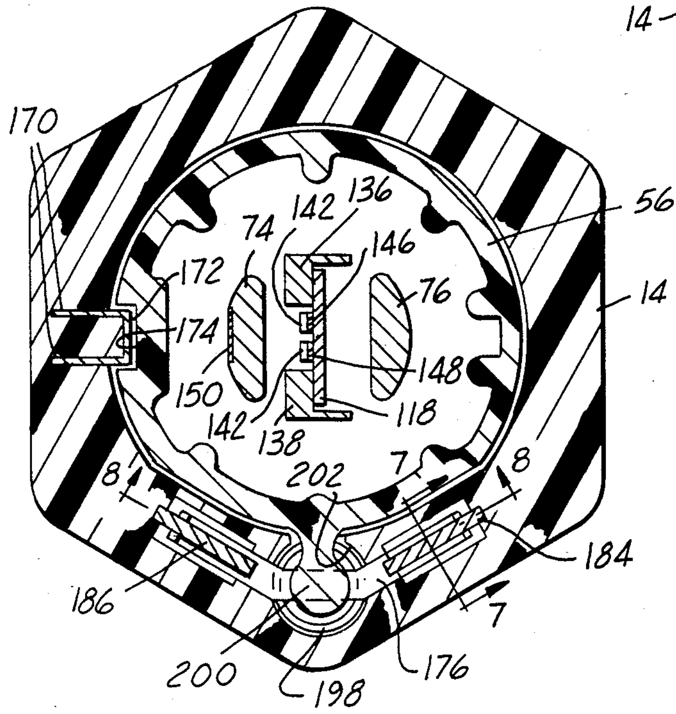
Figure 3:
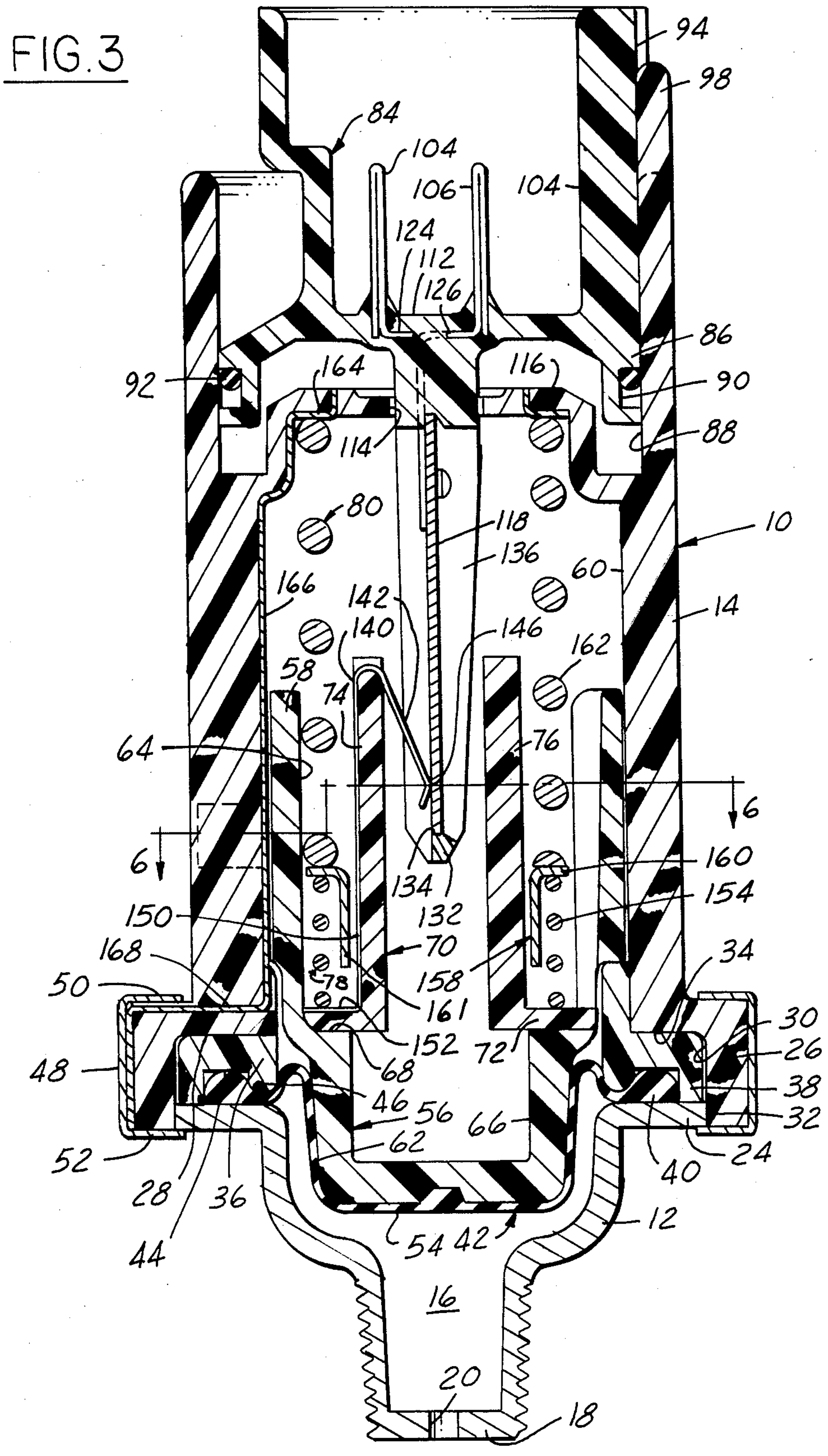
Figure 4:
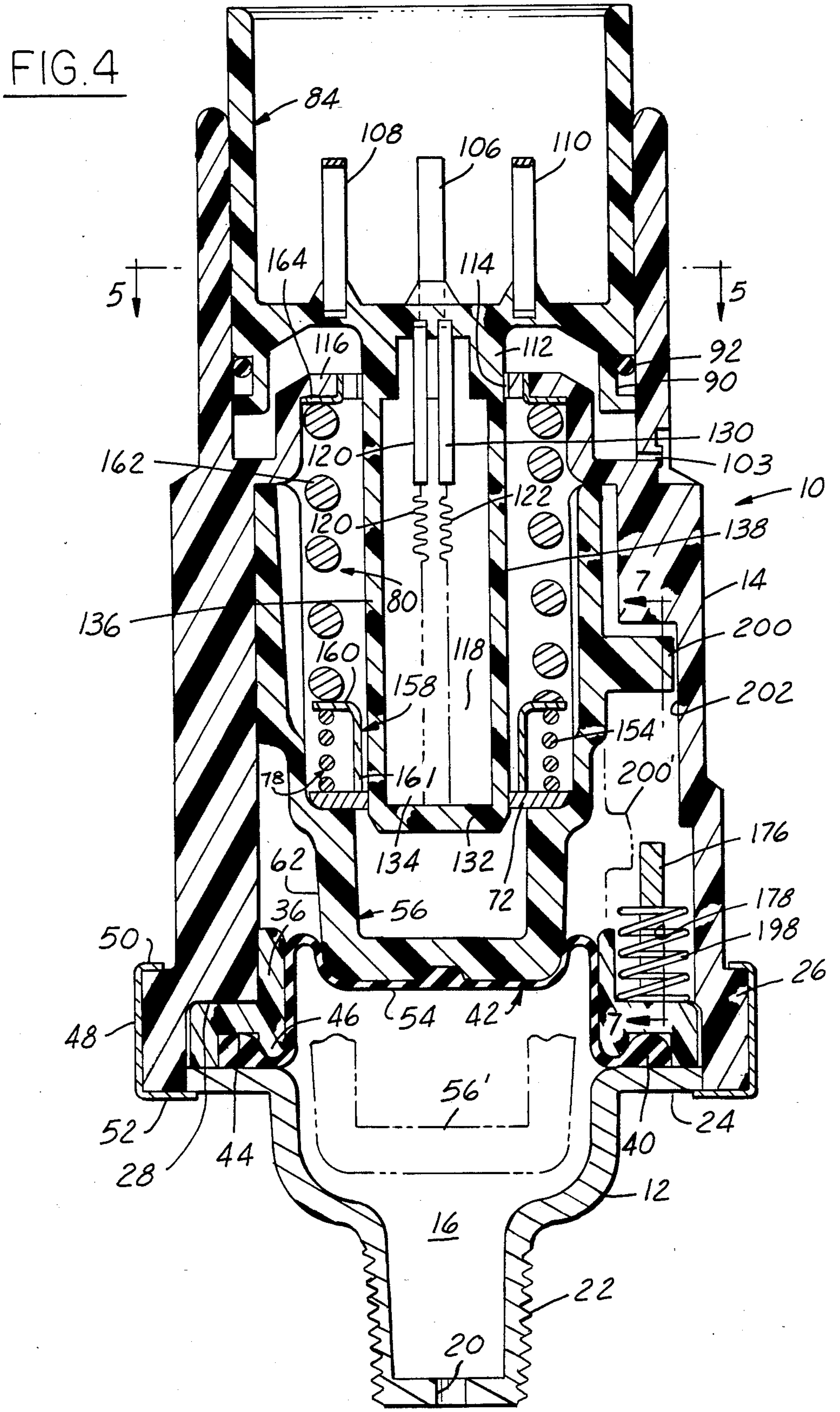

The housing 14 has a substantially tubular configuration as seen from FIGS. 2–4. The outer surface configuration of housing 14 is preferably hexagonally shaped as shown in FIGS. 2 and 6 so that a tool may be applied to rotate the transducer during mounting on an engine. The lower end portion of housing 14 has a thickened and radially or outwardly extending flange portion 26. The flange portion 26 of housing 14 defines an annularly configured recess 28 which includes sidewall 30 with a diameter dimension suitable to receive the outer edge portion 32 of member 12.

The recess 28 in housing 14 defines a shoulder surface 34 for receiving an annular diaphragm securing or lock member 36 which abuts shoulder surface 34. Member 36 includes a radially or outwardly located edge portion 38 which encircles an outer peripheral edge portion 40 of a diaphragm member 42. Specifically, the diaphragm's peripheral edge portion 40 is thickened for reception within an annular groove or channel 44 in the diaphragm securing member 36. The member 36 also includes an annularly shaped rim 46 depending therefrom to engage the diaphragm 42 and secure it against the upper surface of the flange 24 of housing member 12. The aforesaid parts, namely member 36, peripheral edge 40 and flanged edge 24 are secured together and against shoulder 34 by an encircling retainer member 48 with bent or folded over edge portions 50 and 52 respectively.

The diaphragm 42 includes a mid portion 54 which is exposed on one side to the oil in space 16. The mid portion 54 is operatively connected at the other upper side to a piston member 56 which has a generally inverted cup shaped and tubular configuration. The piston 56 includes a substantially cylindrical main body 58 adapted to be reciprocated within a similarly configured surface 60 of housing 14. Thus the mid portion 54 and the piston 56 are supported to reciprocate in an axial direction of the housing 14 or up and down in FIGS. 3 and 4. During this reciprocation, the diaphragm 42 rolls over the outer surface 62 of the lower end of piston member 56. Obviously, the positions of the diaphragm 42 and piston 56 in FIG. 3 correspond to a relatively low or zero pressure of fluid in interior 16. Likewise, the positions of diaphragm 42 and piston 56 in FIG. 4 corresponds to a high pressure of fluid in interior 16.

The interior of the tubular piston member 56 exhibits both a relatively large diameter dimension forming surface 64 and a smaller diameter dimension forming surface 66 nearest to the mid portion 54. An angularly configured shoulder 68 is formed between surfaces 64 and 66 to engagingly support the lower base of a contact support member 70. Specifically, the member 70 includes an annularly shaped base 72 which engages the shoulder 68. A pair of posts or arms 74 and 76 extend upwardly from the base 72 as shown in FIG. 3 and are spaced apart as shown in FIG. 6. The arms act as a support as will be described hereinafter.

The mid portion 54, piston 56 and member 70 are biassed downward towards the low pressure position shown in FIG. 3 as opposed to the higher pressure position of FIG. 4 by means of a pair of coil springs 78 and 80. The springs 78 and 80 are compression type coil springs in series relation to one another or end to end. The lower spring 78 has a smaller spring rate than the upper spring 80 so that upon movement of the piston 56 upward from the position in FIG. 3 to the position in FIG. 4, the lower spring 78 is first compressed before the upper spring 80 is compressed substantially. The purpose of the duel springs will be better understood after the detailed explanation of transducer's switching assembly to be described hereinafter.

A primary function of the pressure transducer 10 is to transmit an electrical signal or indicator corresponding to oil pressure levels sensed within the interior 16 of housing 12. For passing this signal from the transducer, an electrical connector or terminal support member 84 is attached at the upper end of the housing 14. With reference to FIGS. 3 and 4, the terminal support member 84 has a generally cylindrically configured base portion 86 which is insertably received a cylindrical recess 88 of housing 14. The base portion 86 also includes a channel or recess 90 in which an O-ring type seal 92 extends. This provides a seal between the atmosphere an the interior of housing 14. The base portion 86 is dimensioned with respect to the cylindrical recess 88 of housing 14 so that member 84 may be axially moved in the recess 88. The clearance or fit between member 84 and the recess 88 is preferably made very close so that a substantial force is required move the member 84 to the desired axial location or calibration position as will be explained in more detail herein after. The member 84 includes an axially extending guide channel 94 perhaps best shown in FIG. 2. The guide channel 94 has a projecting rail 96 extending axially as does channel 94. The rail 96 slidingly engages an upwardly extending tab like projection 98 of the housing 14. Specifically, two side walled portions 100 and 102 of the member 84 engage side surfaces or edges 98′ and 98′ to prohibit relative rotation between members 84 and 14. It should be noted that the fit between members 14 and 84 is close enough so that insertion of member 84 into recess 88 would be opposed by trapped air. To prevent this, an air bleed aperature 103 is provided in housing 14 as shown in FIG. 4.

The terminal support member 84 includes a recess 104 which is open at the top to receive an electrical connector plug (not shown) for transmitting outputs from the transducer and the switch assembly. A plurality of terminals 104, 106, 108 and 110 extend from member 84 and through recess 104. From FIGS. 3 and 4, it can be seen that the terminal's end portions are double thickeness metal strips formed by reversing or folding over metal strip portions.

The terminals 104–110 also extend downward through a depending central portion 112 of member 84 and are molded therewith. Specifically, two of the terminals 104 and 106 are for measuring oil pressure within interior 16 of housing 12. The central portion 112 extends through an opening 114 in the upper end of member 14 into the interior of housing 14 and in an axial direction therethrough. The portion 112 supports an elongated and flat resistor board 118 in a generally axial orientation within the housing interior. The board 118 includes a pair of elongated resistance grids 120, 122 on one face which grids generally extend in the axial direction. The lower parts of terminals 104 and 106 includes connecting portions 124 and 126 which extend laterally and then axially through the portion 112 of member 84. Accordingly, each of the terminals 104, 106 are connected to a grids 120, 122 respectively. Note from FIG. 4 that the lower portions 128 and 130 of the terminal members extend in parallel to one another and are separated from one another in a noncontacting relationship.

As perhaps best shown in FIGS. 3 and 4, the depending portion 112 of member 84 includes a lower or bottom edge portion 132 which engages the bottom edge portion 134 of the resistor board 118. Also, the depending portion 112 is separated into left and right side portions 136 and 138 to frame the sides of the resistor board 118.

As shown in FIGS. 3 and 6, these side portions 136, 138 and bottom edge 132 define a window for accessing the grids 120, 122. This window or access opening permits an electrical contact assembly 140 to slidingly engage grids 120 and 122. Specifically, the contact assembly 140 has a bifurcated end which forms arms 142 and 144 both being shown in FIG. 6 and one shown in FIG. 3. The very end parts of arms 142 and 146 are formed to produce contact surfaces or pads 146 and 148 theron. These contact surfaces 146 and 148 are urged against board 118 and grids 120 and 122 by the resiliency of the arms 142, 144. The contact assembly 140 further includes a portion 150 which extends generally axially along the one arm portion 74 of member 70. The end 152 of contact assembly 140 which is opposite the contacts 146 and 148 then extends radially or outwardly along base 72 of member 70. In this way the end 152 is engaged by the coil spring 78.

With reference to FIGS. 3 and 4, the lower spring 78 is a compression type of coil spring which includes a spirally formed metal coil 154 which extends upwardly from the end 152 of contact member 140. The upper end of spring 78 contacts an annularly shaped spring separator and stop member 158 and specifically the outwardly extending portion 160 thereof. The member 158 also has a depending portion 161 with a lower edge which is normally spaced upwardly from the portion 72 of member 70 when the transducer is in the zero or low pressure functional position shown in FIG. 3. When the transducer is in the higher pressure functional position shown in FIG. 4, the lighter spring 78 has been contracted until the lower edge of stop 161 engages the base 72 of member 70. Thereafter, heavier spring 80 is compressed.

The aforedescribed construction with two springs and a stop causes the transducer and specifically members 56 and 70 thereof to axially move in the housing from the zero or low pressure position of FIG. 3 to the higher pressure position of FIG. 4. Until the edge of stop 161 engages base portion 72, the initial movement of members 56 and 70 is produced by a relatively small range of pressure change in space 16, such as over about a five PSI range. After the edge of stop portion 161 engages the portion 72, further axially upward movement of members 56 and 70 is resisted by the larger spring rate of spring 80. It is during this compression of spring 80 that the oil pressure is measured for the practical purpose of indicating oil pressure to a vehicle operator. During this measuring process, the pressure forces of oil on the diaphragm 42 moves the piston 56 and member 70 axially in the interior of housing 14 while the board 118 remains stationary. Resultantly, the contacts 146 and 148 of member 140 slide along the board 118 and specifically the grids 120 and 122, respectively.

The aforedescribed relative movements changes the electrical resistance between the terminals and ground or the engine block to which the transducer is mounted. This produces a variable electrical indicating signal corresponding to oil pressure levels. Terminals 104 and 106 are grounded through the contacts 146, 148 and the housing 102 through a variable portion of the grids 120, 122. The electrical grounding circuit also includes the springs 78 and 80, member 158 and a portion 164 of a grounding connector 166. Portion 164 is an annularly shaped part of connector 166 which engages the upper end of spring 80. The remainder of the grounding conductor 166 extends along the inside wall of housing 14 and then a portion 168 extends outwardly and contacts the metallic retainer 48. Retainer 48 is connected by portion 52 to the housing 12 and the associated engine.

As shown in FIGS. 3 and 6, the grounding conductor 166 has outwardly extending tab portions 170 which are molded within the walls of housing 14. Also, the conductor 166 has a generally U-shape along its axial extent. As best seen in FIG. 6, this defines a guide means or bar 172 which interacts with an axial extending groove or channel 174 in the outer surface of piston 56. This prevents undesirable relative rotation between piston 56 and the housing 14.

A second important function besides measuring and indicating oil pressure is provided by this transducer. Specifically, a desirable switching assembly is included for controlling an engine fuel pump motor in correspondance to needed oil pressure for lubrication. The fuel pump supplies fuel to an engine fuel injection apparatus of the engine. The engine probably will not start and certainly will not run long unless the fuel pump and the electric motor driving it are energized. When the engine's oil pressure is zero or near zero, the engine should not start or be run and the fuel pump should be deactivated. This will prevent damage to the engines bearings and the like insufficient oil pressure. After operation of the engine starter motor causes the oil pressure to increase sufficiently for engine lubrication, the fuel pump may then be activated for engine starting. In accord with the aforedescribed process, the transducer and specifically the piston movement thereof serves to operate a switch device. The switch is perhaps best shown in FIGS. 4, 6–9. It includes a contact bar 176 which extends in a circumferential direction through the wall of housing 14. Contact bar 176 is supported in a generally circumferentially directed tunnel or channel 178 formed in housing 14. The dimensions of the tunnel 178 in the axial direction are sufficient in relation to the bar's height to allow it to move axially or upwards and downwards as a unit. This is shown by the two views of FIGS. 8 and 9.

Figure 7:
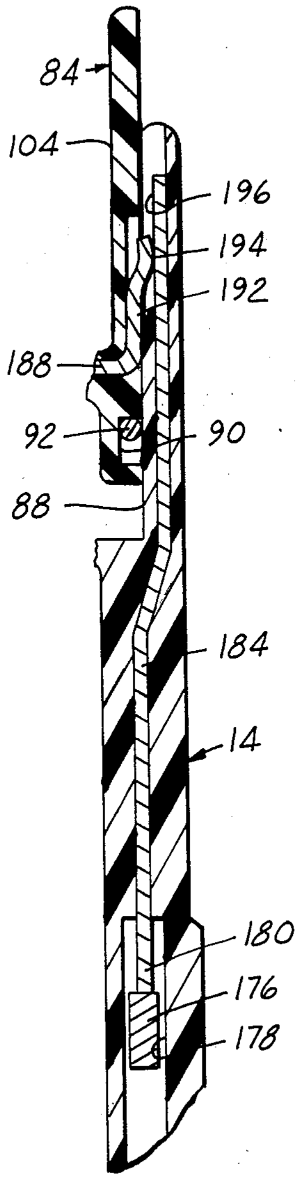
Figure 8:
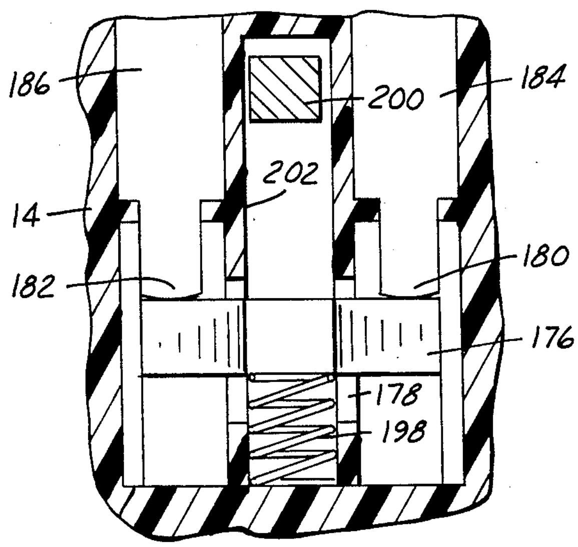

In FIGS. 4, 7 and 8, the bar 176 is shown in its upward position which activates an associated fuel pump motor. In this activating position, the bar 176 contacts the two end portions 180 and 182 of a pair of elongated conductors 184 and 186, respectively. The conductors 184, 186 extend mostly within the wall of housing 14 as best shown in FIG. 7. When in this activating position, pump motor energizing circuit is completed across the ends 180 and 182 by bar 176. The complete motor energization circuit extends from a power source such as a battary, through one of the remaining terminals 108, through the conductors 184 and 186 and the bar 176, through the other terminal 110 and to the fuel pump motor.

Figure 5:
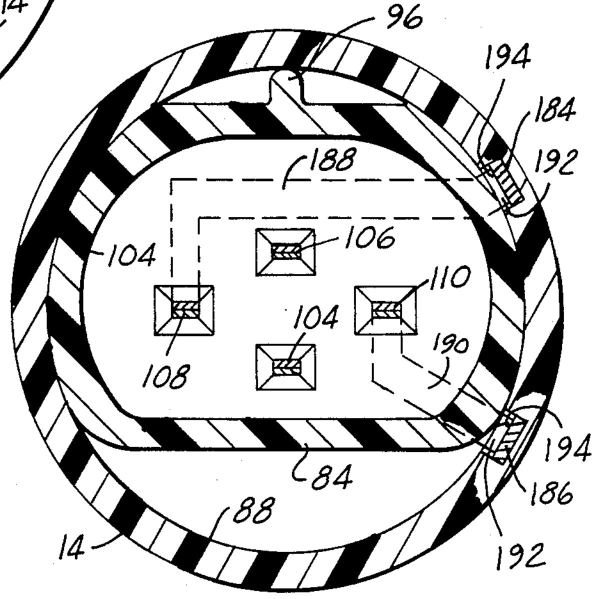

Each of the terminals 108 and 110 includes a connecting portion 188 and 190, respectively. The portions 188, 190 extend through and are mostly molded within portions of member 84. The radially outermost end portions 192 of the terminal extentions or connectors 188 and 190 are configured to contact the upper ends of the conductors in good electrical engagement. Specifically, as shown in FIG. 7, a side sectioned view of the end configuration 192 of one connectors 188 is shown. The end 192 is bent upwardly from the radial plane of the main portion 188 in the base of member 84. The end is then curved to form a limited contact surface 194 to engage an inwardly facing exposed surface 196 of the conductor 184. The end portion of the other connector 190 is similarly formed to engage with the exposed upper end portion of the other conductor 186 as can be determined from FIG. 5. As a result, electrical continuity is completed between the terminals 108, 110 and their respective conductors 184 and 186, respectively.

The position of conductor bar 176 in housing 14 illustrated in FIGS. 4, 7, corresponds to the previously described pump motor activation or energizing position. As in FIG. 4, the lubricating oil pressure in interior 16 is sufficient for running the engine and the piston 56 is in a relatively upward position. In this functional mode of operation, a light spring 198 which is located beneath the conductor bar 176 urges it upward against the end portions 180 and 182 of conductors and the above described circuit is completed.

When the lubricating oil pressure in interior 16 of housing 12 is zero or near zero, the piston 56 assumes the downward position in FIG. 3 due to the urging of springs 78 and 80. As seen in FIG. 4, the piston 56 has an integral projection or boss 200 extending outwardly therefrom. The boss 200 projects into a cavity or channel 202 in the housing 14. The channel 202 has sufficient axial dimension to permit upward and downward movement of the piston boss 200 within the range of movement of the piston 56.

Figure 9:
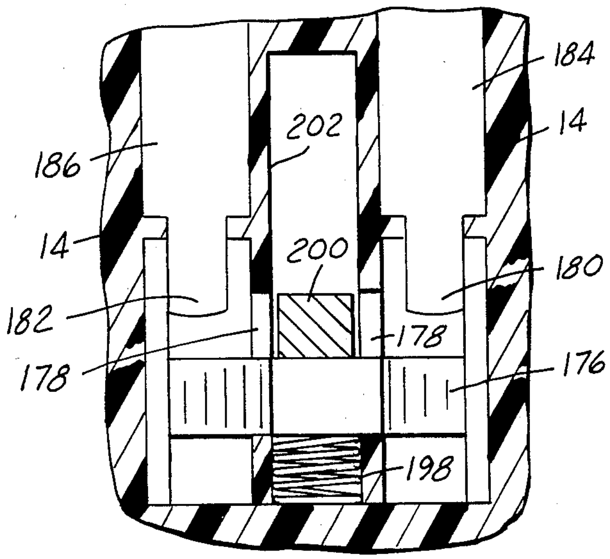

When the oil pressure is at or near zero, the downward positions 56′ and 200′ of piston 56 and boss 200 in FIG. 4 are produced by the force of springs 78, 90. The downward positioning of the boss 200′ in the channel 202 causes the conductor bar 176 to also be positioned downwardly against the urging of spring 198 as shown in FIG. 9. This disconnects the conductor bar 176 from the ends 180 and 182 of conductor strips 184 and 186. As a result, the circuit for the fuel pump motor is deenergized and the fuel pump is deactivated.

Although the preceding detailed description of the transducer is specific to one embodiment combining the functions of a fluid pressure transducer and a fluid pressure responsive switch device, the invention is not necessarily limited to the total combination except as described by the claims. It also should be understood that the specific device is subject to modifications which may not fall outside the scope of the following claims which define the invention.

We claim:

1. An improved fluid pressure transducer, comprising: generally hollow first and second housing members attached together in an end to end manner; a diaphragm member with a peripheral edge and a flexible mid portion, the edge being attached between the housings and the mid portion having first and second surfaces whereby the first surface is exposed to pressurized fluid and the second surface is exposed to atmosphere thereby generating a net pressure force on the mid portion; a piston member having an end portion operatively attached to the mid portion, an integral tubular portion of the piston extending within the second housing, whereby the piston is supported for axial reciprocation in the interior of the second housing corresponding to the movements of the mid portion; the second housing having an outwardly extending end wall which defines an end recess; a terminal support member insertably adjustable within the recess and having an elongated central portion which extends generally co-axially into the interior of the second housing; an electrical circuit board attached to the terminal support member and extending in the axial direction with respect to the piston member and through the interior of the tubular piston, an electrical resistance grid on one exposed surface of the circuit board; a contact support member attached to the piston for movements therewith and having a contact thereon adapted to slide along the elongated grid as the piston moves relative to the stationary circuit board; the central portion of the terminal support member is separated into two spaced side edge portions to engage and support the board yet expose the surface of the board and the grid thereon to the contact portion of the assembly, whereby the resistance of a pressure indicating circuit including the contact and the circuit board varies in response to the relative movement therebetween and corresponding to the pressure of fluid adjacent to the diaphragm.

2. An improved fluid pressure transducer, comprising: generally hollow first and second housing members attached together in an end to end manner; a diaphragm member with a peripheral edge and a flexible mid portion, the edge being attached between the housings and mid portion having first and second surfaces whereby the first surface is exposed to pressurized fluid and the second surface is exposed to atmosphere thereby generating a net pressure force on the mid portion; a piston member having an end portion operatively attached to the mid portion, an integral tubular portion of the piston extending within the second housing, whereby the piston is supported for axial reciprocation in the interior of the second housing corresponding to the movements of the mid portion; the second housing having an outwardly extending end wall which defines an end recess; a terminal support member insertably adjustable within the recess and having an elongated central portion which extends generally co-axially into the interior of the second housing; an electrical circuit board attached to the terminal support member and extending in the axial direction with respect to the piston member and through the interior of the tubular piston, an electrical resistance grid on one exposed surface of the circuit board; a contact support member attached to the piston for movements therewith and having a contact thereon adapted to slide along the elongated grid as the piston moves relative to the stationary circuit board; the dimensions of the recess and the terminal support member are such relative to one another that the insertion of the support member in the recess is resisted by significant friction sufficient to maintain the support member in the recess despite normal attachment and detachment forces exerted thereon by an associated electrical connector, whereby the resistance of a pressure indicating circuit including the contact and the circuit board varies in response to the relative movement therebetween and corresponding to the pressure of fluid adjacent the diaphragm.

* * * * *